United States Patent
Okuyama et al.

(10) Patent No.: US 10,826,383 B2
(45) Date of Patent: Nov. 3, 2020

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Ryota Okuyama, Chuo-ku (JP); Taichiro Tsuchiya, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/494,923

(22) PCT Filed: Mar. 22, 2017

(86) PCT No.: PCT/JP2017/011405
§ 371 (c)(1),
(2) Date: Sep. 17, 2019

(87) PCT Pub. No.: WO2018/173144
PCT Pub. Date: Sep. 27, 2018

(65) Prior Publication Data
US 2020/0287455 A1 Sep. 10, 2020

(51) Int. Cl.
*H02M 1/32* (2007.01)
*H02M 1/42* (2007.01)
*H02M 7/5387* (2007.01)
*H02M 1/00* (2006.01)

(52) U.S. Cl.
CPC .............. *H02M 1/32* (2013.01); *H02M 1/42* (2013.01); *H02M 7/53871* (2013.01); *H02M 2001/007* (2013.01)

(58) Field of Classification Search
CPC ...... H02M 1/32; H02M 7/53871; H02M 1/42; H02M 2001/007
See application file for complete search history.

(56) References Cited

U.S. PATENT DOCUMENTS

| | | | | |
|---|---|---|---|---|
| 5,642,275 A | * | 6/1997 | Peng | H02M 7/49 363/137 |
| 9,722,507 B2 | * | 8/2017 | Nakazawa | H02M 1/36 |
| 2014/0103887 A1 | | 4/2014 | Akagi et al. | |

FOREIGN PATENT DOCUMENTS

WO    WO 2012/099176 A1    7/2012

OTHER PUBLICATIONS

International Search Report dated Apr. 25, 2017 in PCT/JP2017/011405 filed on Mar. 22, 2017.

* cited by examiner

*Primary Examiner* — Kyle J Moody
(74) *Attorney, Agent, or Firm* — Oblon, McClelland, Maier & Neustadt, L.L.P.

(57) ABSTRACT

In the present power conversion device, when a fault occurs in a power system (1) and DC voltage (VDC) of a capacitor (15) included in a unit converter (5) exceeds a protection level (VH), the operation of an inverter (10) is stopped. When the DC voltage (VDC) decreases to a recovery level (V1) or lower, DC voltage control of the inverter (10) is resumed to quickly decrease the DC voltage (VDC). When the DC voltage (VDC) decreases to a recovery level (V2) or lower, reactive power control of the inverter (10) is resumed. Thus, even when a fault occurs in the power system (1), the operation of the inverter (10) can be quickly resumed.

8 Claims, 12 Drawing Sheets

POWER CONVERSION DEVICE

TECHNICAL FIELD

The present invention relates to a power conversion device, more specifically to a power conversion device coupled to a power system.

BACKGROUND ART

WO 2012/099176 (PTL 1) discloses a power conversion device called MMCC (Modular Multilevel Cascade Converter). This power conversion device is used as, for example, a reactive power compensator and includes delta-connected three arms. Each arm includes a plurality of capacitors and a plurality of cascaded inverters. Each inverter includes a plurality of semiconductor switching elements and transfers power between the corresponding capacitor and a power system.

CITATION LIST

Patent Literature

PTL 1: WO 2012/099176

SUMMARY OF INVENTION

Technical Problem

In such a power conversion device, if a fault occurs in the power system to cause a voltage rise in the power system, active current may flow into the capacitor from the power system through the inverter, and the direct-current (DC) voltage of the capacitor may exceed a permissible level. When the inverter operates in this case, a surge voltage occurs to break the semiconductor switching element.

Then, the operation of the inverter may be stopped when the DC voltage of the capacitor exceeds a protection level equal to or lower than the permissible level, and the operation of the inverter may be resumed when the DC voltage of the capacitor decreases to a recovery level equal to or lower than the protection level. This method, however, takes a longer time to decrease the DC voltage of the capacitor to the recovery level and increases the downtime of the inverter.

Figure 12:
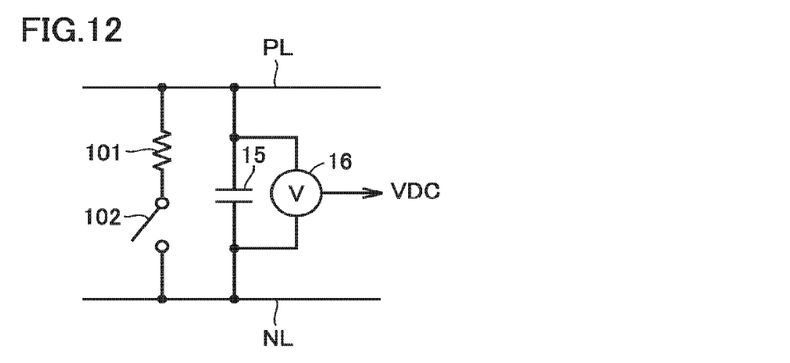
FIG. 12 is a circuit diagram showing another Comparative Example for the present embodiment.

One of the methods to cope with this is that a series connection of a resistor element and a switch is connected in parallel with a capacitor, and in response to DC voltage of the capacitor exceeding the protection level, the switch is turned on to allow current to flow from the capacitor to the resistor element to quickly decrease the DC voltage of the capacitor (see FIG. 12).

This method, however, requires provision of resistor elements and switches as many as capacitors and increases the device size.

A main object of the present invention is therefore to provide a compact power conversion device capable of quickly resuming the operation of inverters even when a fault occurs in a power system.

Solution to Problem

A power conversion device according to the present invention includes a capacitor, an inverter configured to transfer electric power between the capacitor and a power system, a first controller configured to perform DC voltage control of the inverter such that DC voltage of the capacitor attains a first command value, and a second controller configured to perform reactive power control of the inverter such that reactive power transferred between the capacitor and the power system attains a second command value. The first and second controllers stop the DC voltage control and the reactive power control, respectively, in response to the DC voltage exceeding a protection level higher than the first command value. The first controller resumes the DC voltage control in response to the DC voltage decreasing to a first recovery level or lower, the first recovery level being equal to or lower than the protection level. The second controller resumes the reactive power control in response to the DC voltage decreasing to a second recovery level or lower, the second recovery level being lower than the first recovery level.

Advantageous Effects of Invention

In the power conversion device according to the present invention, when DC voltage of the capacitor exceeds the protection level, the operation of the inverter is stopped. When the DC voltage decreases to the first recovery level or lower, only the DC voltage control of the inverter is resumed to quickly reduce the DC voltage. When the DC voltage decreases to the second recovery level or lower, the reactive power control of the inverter is resumed. Thus, even when a fault occurs in the power system, the operation of the inverter can be quickly resumed. Compared with when a series connection of a resistor element and a switch is connected in parallel with a capacitor, the size of the device can be reduced.

DESCRIPTION OF EMBODIMENTS

Figure 1:
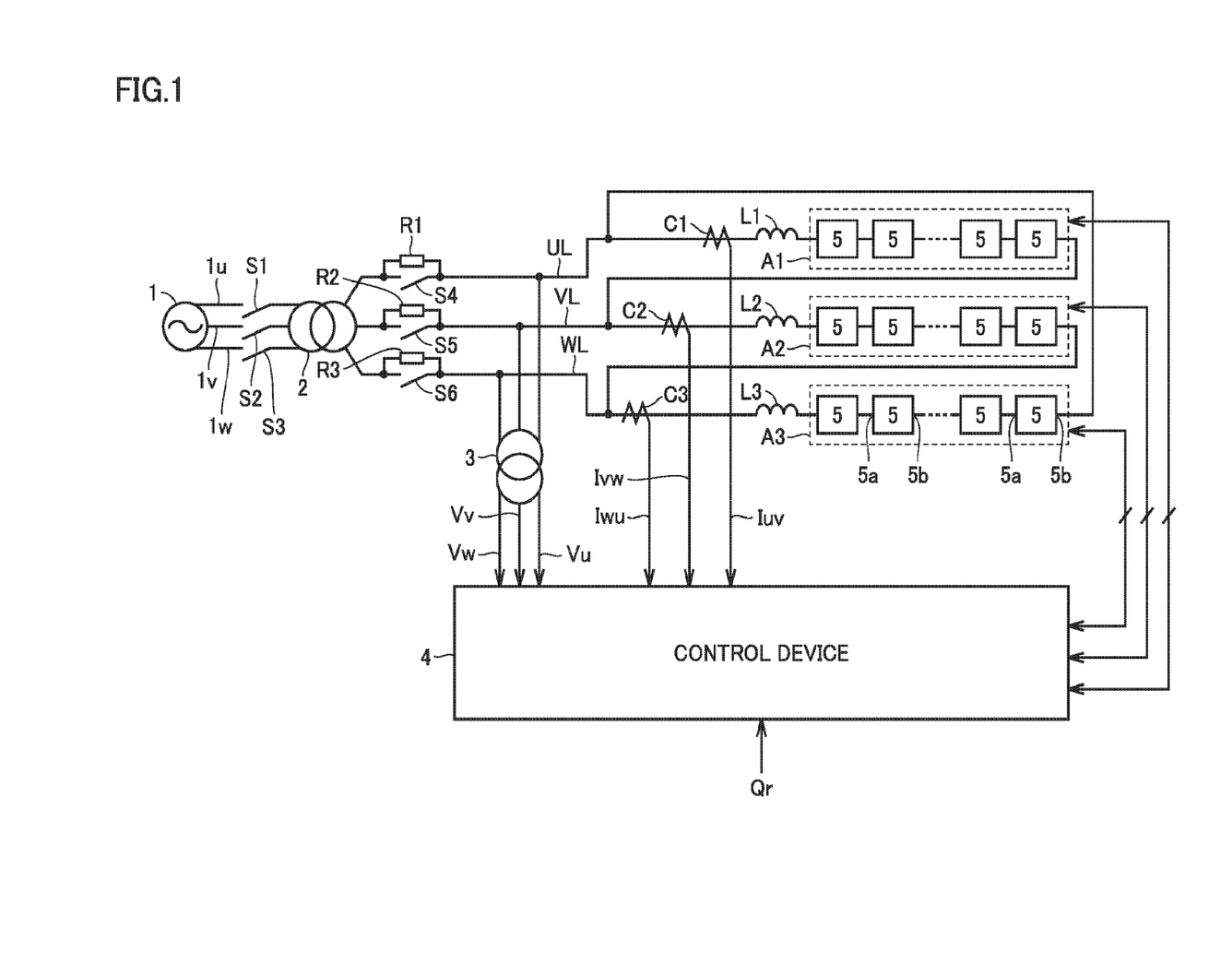
FIG. 1 is a circuit block diagram showing a configuration of a power conversion device according to an embodiment of the present invention.

FIG. 1 is a circuit block diagram showing a configuration of a power conversion device according to an embodiment of the present invention. In FIG. 1, this power conversion device is used as a reactive power compensator that compensates for reactive power of a power system 1 and includes switches S1 to S6, transformers 2 and 3, current-limiting resistors R1 to R3, alternating-current (AC) lines UL, VL, and WL, current transformers C1 to C3, reactors L1 to L3, arms A1 to A3, and a control device 4.

Each of switches S1 to S3 has one terminal connected to the corresponding one of three phase transmission lines $1u$, $1v$, and $1w$ of power system 1 and the other terminal connected to the corresponding one of three primary windings of transformer 2. Switches S1 to S3 are normally on and turned off, for example, during maintenance of the power conversion device. Transformer 2 includes three primary windings and three secondary windings to transfer three-phase AC power.

Each of current-limiting resistors R1 to R3 has one terminal connected to the corresponding one of three secondary windings of transformer 2 and the other terminal connected to one terminal of the corresponding one of AC lines UL, VL, and WL. Current-limiting resistors R1 to R3 limit current flowing from power system 1 to arms A1 to A3 on start-up of the power conversion device.

Switches S4 to S6 are connected in parallel with current-limiting resistors R1 to R3, respectively, and turned on when current flowing through arms A1 to A3 becomes stable on start-up of the power conversion device. Transformer 3 feeds back AC voltages Vu, Vv, and Vw having values corresponding to AC voltages of AC lines UL, VL, and WL to control device 4.

Reactor L1 and arm A1 are connected in series between the other terminal of AC line UL and the other terminal of AC line VL. Reactor L2 and arm A2 are connected in series between the other terminal of AC line VL and the other terminal of AC line WL. Reactor L3 and arm A3 are connected in series between the other terminal of AC line WL and the other terminal of AC line UL. That is, arms A1 to A3 are delta-connected.

Reactors L1 to L3 suppress circulating current flowing through arms A1 to A3. Reactors L1 to L3 may be provided separately from arms A1 to A3 or may be inductance components of arms A1 to A3. Arms A1 to A3 are controlled by control device 4 to generate three-phase AC power. Current transformers C1 to C3 feed back AC currents Iuv, Ivw, and Iwu having values corresponding to AC currents flowing through arms A1 to A3, respectively, to control device 4.

Each of arms A1 to A3 includes a plurality of (for example, 20) cascaded unit converters 5. A plurality of unit converters 5 each generate AC current in accordance with a control signal etc. from control device 4.

Figure 2:
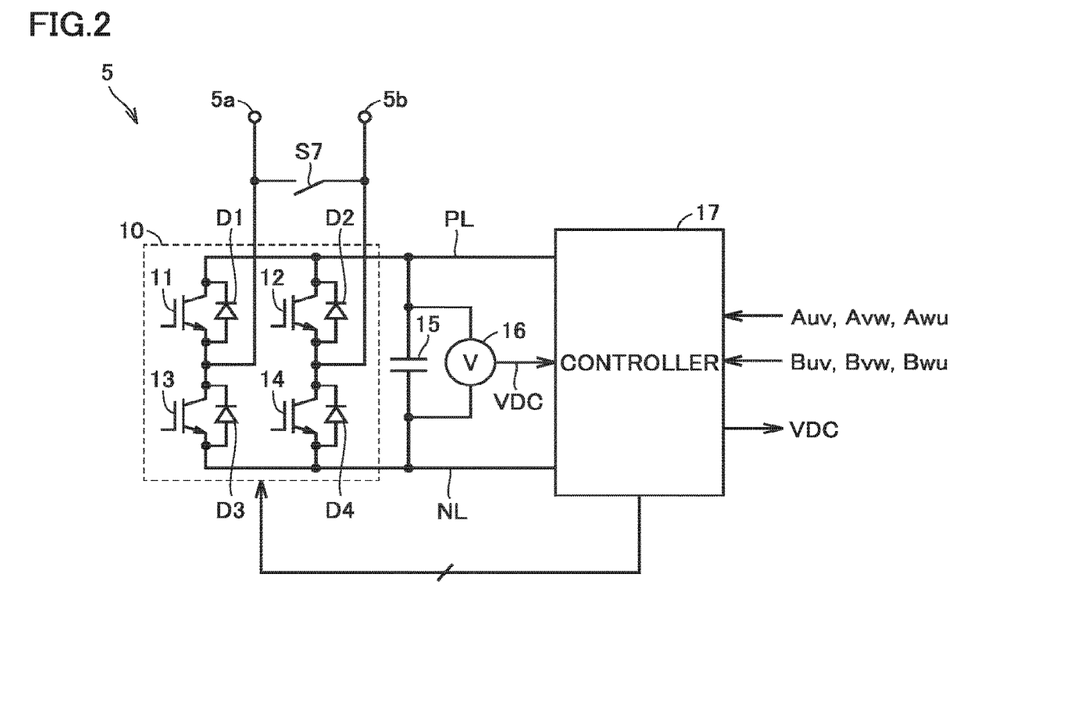
FIG. 2 is a circuit block diagram showing a configuration of a unit converter shown in FIG. 1.

FIG. 2 is a circuit block diagram showing a configuration of unit converter 5. In FIG. 2, unit converter 5 includes AC terminals $5a$ and $5b$, a switch S7, an inverter 10, DC lines PL and NL, a capacitor 15, a voltage detector 16 (first detector), and a controller 17.

AC terminals $5a$ of unit converters 5 on the first stage of arms A1 to A3 are respectively connected to the other terminals of AC lines UL, VL, and WL through reactors L1 to L3. AC terminals $5b$ of unit converters 5 on the final stage of arms A1 to A3 are respectively connected to the other terminals of AC lines VL, WL, and UL. AC terminal $5a$ of each of the other unit converters 5 is connected to AC terminal $5b$ of unit converter 5 on the previous stage, and AC terminal $5b$ is connected to AC terminal $5a$ of unit converter 5 on the next stage.

Switch S7 is connected between AC terminals $5a$ and $5b$ and controlled, for example, by control device 4. Switch S7 is turned off when the corresponding unit converter 5 is normal and is turned on when the corresponding unit converter 5 is failed. When switch S7 is turned on, a short circuit occurs between AC terminals $5a$ and $5b$ and the corresponding unit converter 5 is bypassed.

Inverter 10 includes IGBTs (Insulated Gate Bipolar Transistors) 11 to 14 and diodes D1 to D4. The collectors of IGBTs 11 and 12 are both connected to the positive-side DC line PL and the emitters thereof are respectively connected to AC terminals $5a$ and $5b$. The collectors of IGBTs 13 and 14 are respectively connected to AC terminals $5a$ and $5b$ and the emitters thereof are both connected to the negative-side DC line NL. The gate of each of IGBTs 11 to 14 receives a gate signal from controller 17. Diodes D1 to D4 are respectively connected in anti-parallel with IGBTs 11 to 14.

Inverter 10 undergoes DC voltage control and reactive power control by control device 4 and controller 17 and transfers power between power system 1 and capacitor 15. Capacitor 15 is connected between DC lines PL and NL and stores DC power. Voltage detector 16 outputs DC voltage VDC having a value corresponding to DC voltage between the terminals of capacitor 15 to controller 17.

Controller 17 is connected to DC lines PL and NL and is driven by DC power stored in capacitor 15. Controller 17 operates inverter 10 based on gate signals Auv, Buy, Avw, Bvw, Awu, and Bwu from control device 4 and transmits a signal indicating DC voltage VDC from voltage detector 16 to control device 4.

Returning to FIG. 1, control device 4 controls each of three arms A1 to A3 (that is, each of 60 unit converters 5) based on reactive power command value Qr, AC voltages Vu, Vv, and Vw from transformer 3, AC currents Iuv, Ivw, and Iwu from current transformers C1 to C3, DC voltage VDC from each unit converter 5, and the like. Reactive power command value Qr is applied, for example, from the central control center of power system 1. The power conversion device supplies reactive power having a value corresponding to reactive power command value Qr to power system 1.

Figure 3:
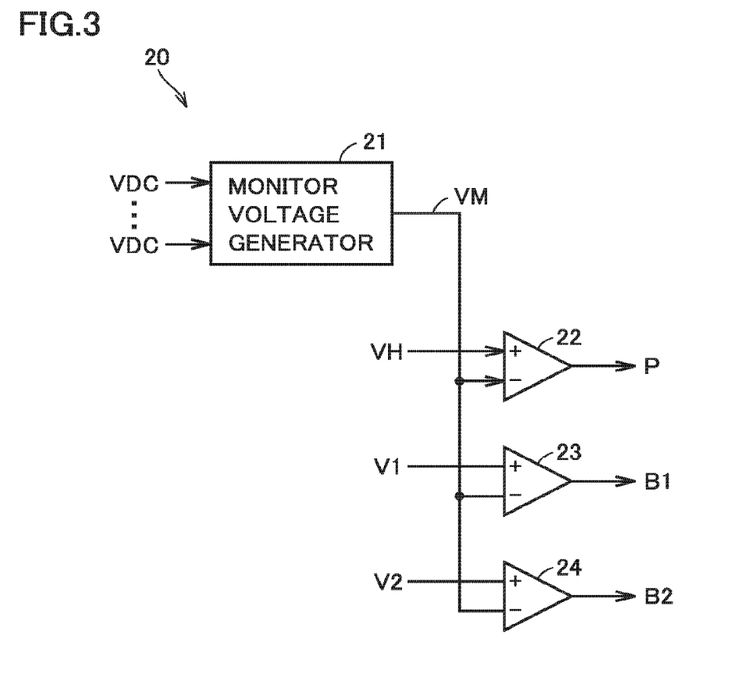
FIG. 3 is a circuit block diagram showing a configuration of a signal generation circuit included in the control device shown in FIG. 1.

FIG. 3 is a circuit block diagram showing a configuration of a signal generation circuit 20 included in control device 4. In FIG. 3, signal generation circuit 20 includes a monitor voltage generator 21 and comparators 22 to 24. Monitor voltage generator 21 generates monitor voltage VM based on DC voltages VDC from 60 unit converters 5. Monitor voltage generator 21, for example, selects the highest DC voltage VDC of 60 DC voltages VDC and outputs the selected DC voltage VDC as monitor voltage VM.

Comparator 22 compares the levels of monitor voltage VM and protection level VH and generates protection signal P based on the comparison result. When monitor voltage VM is equal to or lower than protection level VH (VM≤VH), protection signal P is brought to "H" level that is the deactivation level. When monitor voltage VM is higher than protection level VH (VM>VH), protection signal P is brought to "L" level that is the activation level.

Protection level VH is a voltage equal to or lower than a permissible level and higher than the rating value and the command value of DC voltage VDC. When a fault occurs in power system 1, active current may flow into capacitor 15 from power system 1 through inverter 10, and DC voltage VDC of capacitor 15 may rise to exceed the permissible level.

In such a case, if IGBTs 11 to 14 of inverter 10 are driven, a surge voltage may be produced to break IGBTs 11 to 14. Then, in this power conversion device, when monitor voltage VM exceeds protection level VH, protection signal P is lowered from "H" level to "L" level to stop the operation of all the inverters 10.

Comparator 23 compares the levels of monitor voltage VM and recovery level V1 (<VH) and generates recovery signal B1 based on the comparison result. When monitor voltage VM is higher than recovery level V1 (VM>V1), recovery signal B1 is brought to "L" level that is the deactivation level. When monitor voltage VM is equal to or lower than recovery level V1 (VM≤V1), recovery signal B1 is brought to "H" level that is the activation level.

Recovery level V1 is a voltage lower than protection level VH and higher than the rating value and the command value of DC voltage VDC. After power system 1 recovers to the normal state from a fault, it is necessary to quickly resume the operation of the power conversion device. However, if reactive power control of inverter 10 is resumed immediately when DC voltage VDC of capacitor 15 becomes equal to or lower than protection level VH, reactive power is supplied from the power conversion device to power system 1, so that the voltage of power system 1 rises and DC voltage VDC of capacitor 15 rises again to exceed protection level VH. As a result, operation and stop of inverter 10 are repeated, and the power conversion device does not operate normally.

Then, in this power conversion device, when monitor voltage VM decreases to recovery level V1 or lower during the stop of operation of inverter 10, recovery signal B1 is raised from "L" level to "H" level to resume only the DC voltage control of inverter 10. This enables DC voltage VDC of capacitor 15 to decrease quickly without increasing the voltage of power system 1.

Comparator 24 compares the levels of monitor voltage VM and recovery level V2 (<V1) and generates recovery signal B2 based on the comparison result. When monitor voltage VM is higher than recovery level V2 (VM>V2), recovery signal B2 is brought to "L" level that is the deactivation level. When monitor voltage VM is equal to or lower than recovery level V2 (VM≤V2), recovery signal B2 is brought to "H" level that is the activation level.

Recovery level V2 is a voltage lower than recovery level V1 and higher than the rating value and the command value of DC voltage VDC. Recovery level V2 is set to such a value that DC voltage VDC is unlikely to exceed protection level VH even when the voltage of power system 1 rises because of the resumption of the reactive power control of inverter 10, and DC voltage VDC of capacitor 15 rises again.

Accordingly, when monitor voltage VM decreases to recovery level V2 or lower, DC voltage control and reactive power control of inverter 10 are resumed, and the operation of the power conversion device recovers to the normal state.

Figure 4:
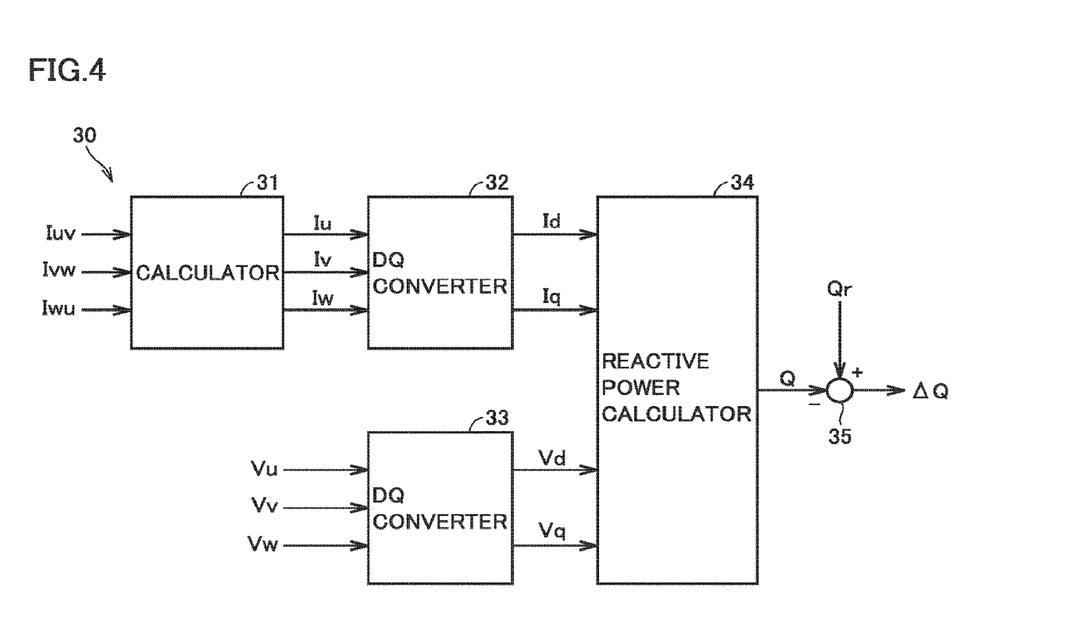
FIG. 4 is a block diagram showing a configuration of a reactive power deviation calculating unit included in the control device shown in FIG. 1.

FIG. 4 is a block diagram showing a configuration of a reactive power deviation calculating unit 30 included in control device 4. In FIG. 4, reactive power deviation calculating unit 30 includes a calculator 31, DQ converters 32 and 33, a reactive power calculator 34, and a subtractor 35.

Calculator 31 obtains AC currents Iu, Iv, and Iw at levels corresponding to AC currents flowing through AC lines UL, VL, and WL, based on AC currents Iuv, Ivw, and Iwu from current transformers C1 to C3.

DQ converter 32 converts three phase AC currents Iu, Iv, and Iw to d-axis current Id and q-axis current Iq. DQ converter 33 converts three phase AC voltages Vu, Vv, and Vw from transformer 3 to d-axis voltage Vd and q-axis voltage Vq. Reactive power calculator 34 obtains reactive power Q based on d-axis current Id, q-axis current Iq, d-axis voltage Vd, and q-axis voltage Vq. Subtractor 35 obtains deviation $\Delta Q = Qr - Q$ between reactive power command value Qr and reactive power Q.

Control device 4 further generates DC voltage command value VDCr corresponding to 60 unit converters 5. DC voltage command value VDCr is applied to 60 unit converters 5. DC voltage command value VDCr is typically set to the rating DC voltage.

Figure 5:
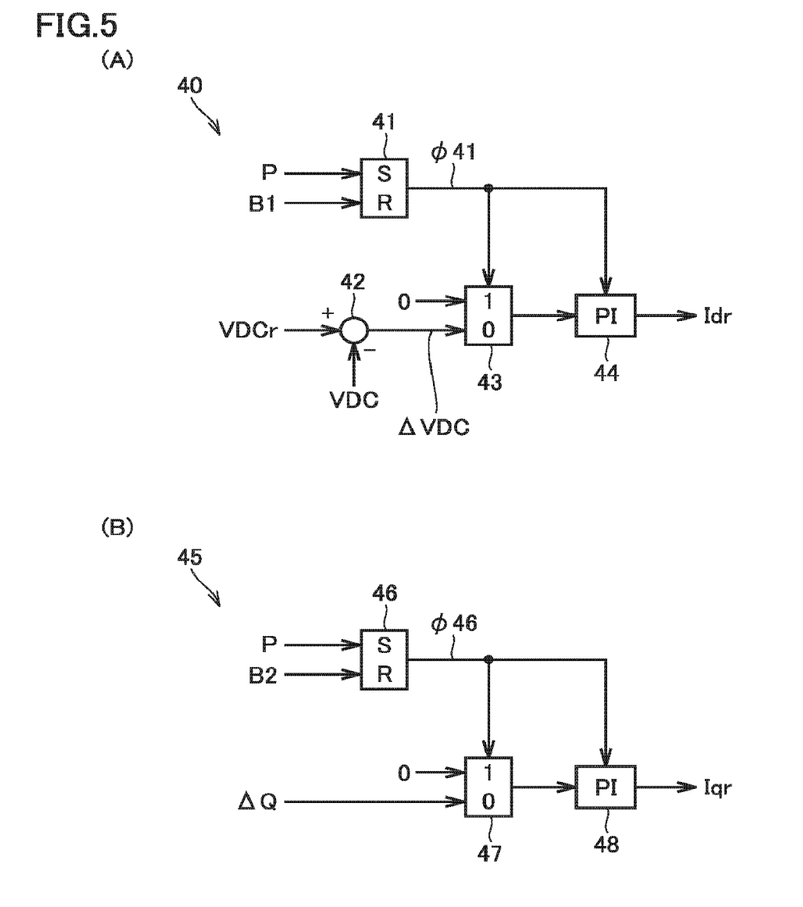
FIG. 5 is a block diagram showing a configuration of a DC voltage controller and a reactive power controller included in the control device shown in FIG. 1.

FIGS. 5(A) and 5(B) are block diagrams showing a configuration of a DC voltage controller 40 and a reactive power controller 45. As shown in FIG. 5(A), DC voltage controller 40 includes a flip-flop 41, a subtractor 42, a switch circuit 43, and a PI (Proportional Integral) controller 44. DC voltage controller 40 configures a first controller that performs DC voltage control of inverter 10 such that DC voltage VDC of capacitor 15 attains DC voltage command value VDCr.

Flip-flop 41 is reset when both of protection signal P and recovery signal B1 are at "H" level and brings output signal φ41 to "L" level (0). Flip-flop 41 is set when protection signal P is lowered from "H" level to "L" level, and raises output signal φ41 from "L" level (0) to "H" level (1). Signal φ41 is applied to each of switch circuit 43 and PI controller 44.

Subtractor 42 obtains deviation $\Delta VDC = VDCr - VDC$ between DC voltage command value VDCr and DC voltage VDC. Switch circuit 43 applies deviation ΔVDC from subtractor 42 to PI controller 44 when signal φ41 is at "L" level (0), and applies "0" to PI controller 44 when signal φ41 is at "H" level (1).

PI controller 44 adds a value proportional to the output value (ΔVDC or 0) from switch circuit 43 to a value of integral of the output value to generate a d-axis current command value Idr. When signal φ41 is at "L" level (0), PI controller 44 adds a value proportional to deviation ΔVDC from switch circuit 43 to a value of integral of deviation ΔVDC to generate d-axis current command value Idr and performs DC voltage control of inverter 10.

When signal φ41 is at "H" level (1), the integral value in PI controller 44 is reset to zero, d-axis current command value Idr is fixed to zero, and DC voltage control of inverter 10 is stopped. When signal φ41 changes from "H" level (1) to "L" level (0), DC voltage control of inverter 10 is resumed.

As shown in FIG. 5(B), reactive power controller 45 includes a flip-flop 46, a switch circuit 47, and a P1 controller 48. Reactive power controller 45 and reactive power deviation calculating unit 30 in FIG. 4 configure a second controller that performs reactive power control of inverter 10 such that reactive power Q transferred between capacitor 15 and power system 1 attains reactive power command value Qr.

Flip-flop 46 is reset when both of protection signal P and recovery signal B2 are at "H" level, and brings output signal φ46 to "L" level (0). Flip-flop 46 is set when protection signal P is lowered from "H" level to "L" level, and raises output signal φ46 from "L" level (0) to "H" level (1). Signal φ46 is applied to each of switch circuit 47 and PI controller 48.

Switch circuit 47 applies reactive power deviation ΔQ from control device 4 to PT controller 48 when signal φ46 is at "L" level (0), and applies "0" to PI controller 48 when signal φ46 is at "H" level (1).

PI controller 48 adds a value proportional to the output value (ΔQ or 0) from switch circuit 47 to a value of integral of the output value to generate q-axis current command value Iqr. When signal φ46 is at "L" level (0), PI controller 48 adds a value proportional to deviation ΔQ from switch circuit 47 to a value of integral of deviation ΔQ to generate q-axis current command value Iqr and performs reactive power control of inverter 10.

When signal φ46 is at "H" level (1), the integral value in PI controller 48 is reset to 0, q-axis current command value Iqr is fixed to zero, and reactive power control of inverter 10 is stopped. When signal φ46 changes from "H" level (1) to "L" level (0), reactive power control of inverter 10 is resumed.

Figure 6:
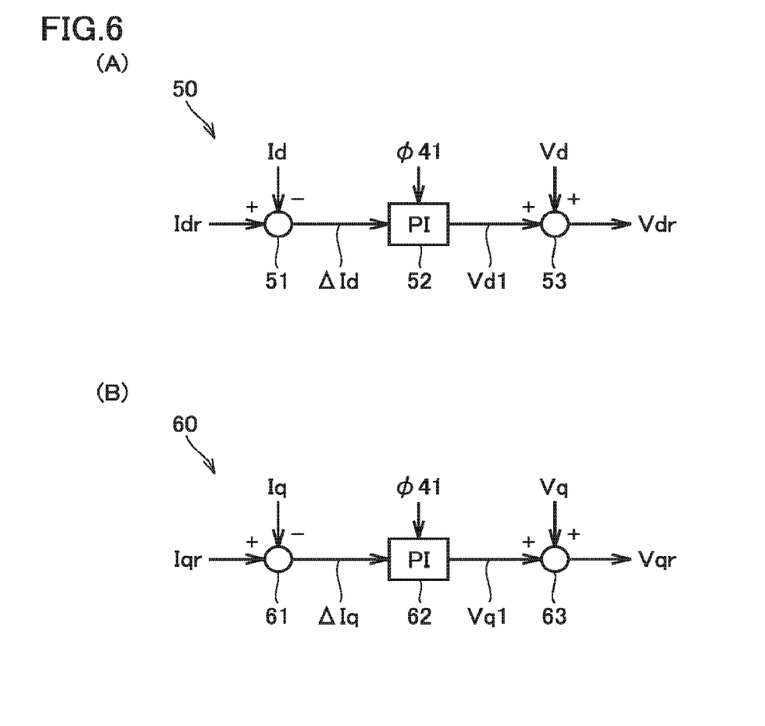
FIG. 6 is a block diagram showing a configuration of a current controller included in the control device shown in FIG. 1.

FIGS. 6(A) and 6(B) are block diagrams showing a configuration of current controllers 50 and 60. As shown in FIG. 6(A), current controller 50 includes a subtractor 51, a PI controller 52, and an adder 53. Subtractor 51 obtains deviation ΔId=Idr−Id between d-axis current command value Idr from DC voltage controller 40 (FIG. 5(A)) and d-axis current Id from DQ converter 32 (FIG. 4).

PI controller 52 is controlled by output signal φ41 of flip-flop 41 (FIG. 5(A)). When signal φ41 is at "L" level (0), PI controller 52 adds a value proportional to deviation ΔId to a value of integral of deviation ΔId to generate d-axis voltage Vd1. When signal φ41 is at "H" level (1), the integral value in PI controller 52 is reset to zero and d-axis voltage Vd1 is fixed to zero. Adder 53 adds d-axis voltage Vd from DQ converter 33 to d-axis voltage Vd1 from PI controller 52 to generate d-axis voltage command value Vdr.

As shown in FIG. 6(B), current controller 60 includes a subtractor 61, a PI controller 62, and an adder 63. Subtractor 61 obtains deviation ΔIq=Iqr−Iq between q-axis current command value Iqr from reactive power controller 45 (FIG. 5(B)) and q-axis current Iq from DQ converter 32 (FIG. 4).

PI controller 62 is controlled by output signal φ41 of flip-flop 41. When signal φ41 is at "L" level (0), PI controller 62 adds a value proportional to deviation ΔIq to a value of integral of deviation ΔIq to generate q-axis voltage Vq1. When signal φ41 is at "H" level (1), the integral value in PI controller 62 is reset to zero and q-axis voltage Vq1 is fixed to zero. Adder 63 adds q-axis voltage Vq from DQ converter 33 to q-axis voltage Vq1 from PI controller 62 to generate q-axis voltage command value Vqr.

Figure 7:
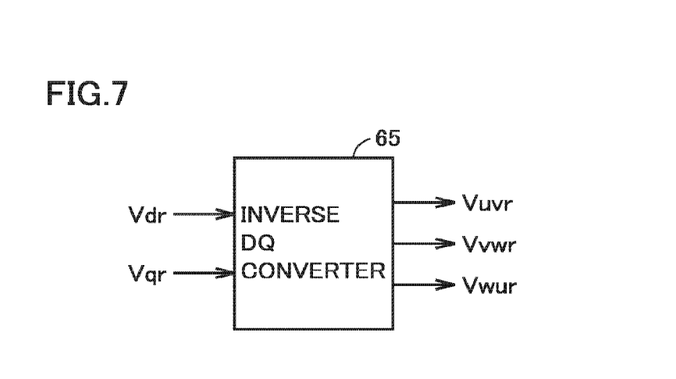
FIG. 7 is a block diagram showing a configuration of an inverse DQ converter included in the control device shown in FIG. 1.

FIG. 7 is a block diagram showing a configuration of an inverse DQ converter 65. In FIG. 7, inverse DQ converter 65 performs inverse DQ transformation of d-axis voltage command value Vdr and q-axis voltage command value Vqr from current controllers 50 and 60 into three phase AC voltage command values Vuvr, Vvwr, and Vwur. Each of three phase AC voltage command values Vuvr, Vvwr, and Vwur is a sinusoidal wave, and the phases of three phase AC voltage command values Vuvr, Vvwr, and Vwur are shifted from each other by 120 degrees.

Figure 8:
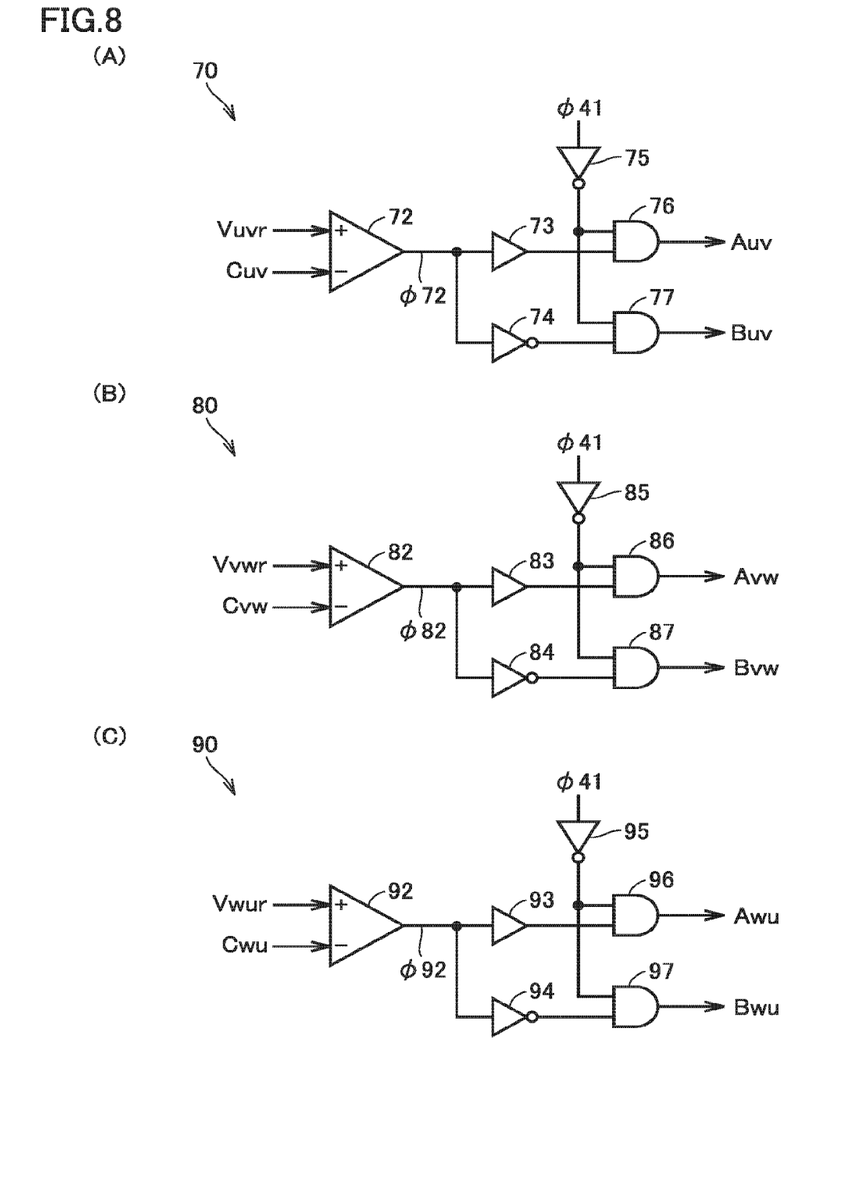
FIG. 8 is a circuit diagram showing a configuration of a gate signal generation circuit included in the control device shown in FIG. 1.

FIGS. 8(A), 8(B), and 8(C) are circuit diagrams showing a configuration of gate signal generation circuits 70, 80, and 90. As shown in FIG. 8(A), gate signal generation circuit 70 includes a comparator 72, a buffer 73, inverters 74 and 75, and AND gates 76 and 77.

Comparator 72 compares the level of AC voltage command value Vuvr with the level of carrier signal Cuv and outputs signal φ72 at a level corresponding to the comparison result. Carrier signal Cuv is a triangular wave signal having a frequency higher than AC voltage command value Vuvr and synchronized with AC voltage command value Vuvr.

When Vuvr>Cuv, signal φ72 goes to "H" level, and when Vuvr<Cuv, signal φ72 goes to "L" level. Buffer 73 applies signal φ72 to one input node of AND gate 76. Inverter 74 inverts signal φ72 and applies the inverted signal to one input node of AND gate 77. Inverter 75 inverts output signal φ41 of flip-flop 41 (FIG. 5(A)) and applies the inverted signal to the other input nodes of AND gates 76 and 77. The output signals of AND gates 76 and 77 are gate signals Auv and Buv, respectively.

When signal φ41 is at "L" level, output signal φ72 of comparator 72 passes through buffer 73 and AND gate 76 to become gate signal Auv, and output signal φ72 of comparator 72 is inverted by inverter 74 and passed through AND gate 77 to become gate signal Buv. When signal φ41 is at "H" level, gate signals Auv and Buv which are output signals of AND gates 76 and 77 are both fixed to "L" level.

Gate signal Auv is applied to the gate of each of IGBTs 11 and 14 included in the corresponding inverter 10, and gate signal Buv is applied to the gate of each of IGBTs 12 and 13 included in the corresponding inverter 10. When signal φ41 is at "L" level, the corresponding inverter 10 is operated by gate signals Auv and Buv. When signal φ41 is at "H" level, gate signals Auv and Buv are fixed to "L" level so that the operation of the corresponding inverter 10 is stopped.

As shown in FIG. 8(B), gate signal generation circuit 80 includes a comparator 82, a buffer 83, inverters 84 and 85, and AND gates 86 and 87. Comparator 82 compares the level of AC voltage command value Vvwr with the level of carrier signal Cvw and outputs signal φ82 at a level corresponding to the comparison result. Carrier signal Cvw is a triangular wave signal having a frequency higher than AC voltage command value Vvwr and synchronized with AC voltage command value Vvwr.

When Vvwr>Cvw, signal φ82 goes to "H" level, and when Vvwr<Cvw, signal φ82 goes to "L" level. Buffer 83 applies signal φ82 to one input node of AND gate 86. Inverter 84 inverts signal φ82 and applies the inverted signal to one input node of AND gate 87. Inverter 85 inverts output signal φ41 of flip-flop 41 (FIG. 5(A)) and applies the inverted signal to the other input nodes of AND gates 86 and 87. The output signals of AND gates 86 and 87 are gate signals Avw and Bvw, respectively.

When signal φ41 is at "L" level, output signal φ82 of comparator 82 passes through buffer 83 and AND gate 86 to become gate signal Avw, and output signal φ82 of comparator 82 is inverted by inverter 84 and passed through AND gate 87 to become gate signal Bvw. When signal φ41 is at "H" level, gate signals Avw and Bvw which are output signals of AND gates 86 and 87 are both fixed to "L" level.

Gate signal Avw is applied to the gate of each of IGBTs 11 and 14 in the corresponding inverter 10, and gate signal Bvw is applied to the gate of each of IGBTs 12 and 13 included in the corresponding inverter 10. When signal φ41 is at "L" level, the corresponding inverter 10 is operated by gate signals Avw and Bvw. When signal φ41 is at "H" level, gate signals Avw and Bvw are fixed to "L" level so that the operation of the corresponding inverter 10 is stopped.

As shown in FIG. 8(C), gate signal generation circuit 90 includes a comparator 92, a buffer 93, inverters 94 and 95, and AND gates 96 and 97. Comparator 92 compares the level of AC voltage command value Vwur with the level of carrier signal Cwu and outputs signal φ92 at a level corresponding to the comparison result. Carrier signal Cwu is a triangular wave signal having a frequency higher than AC voltage command value Vwur and synchronized with AC voltage command value Vwur.

When Vwur>Cwu, signal φ92 goes to "H" level, and when Vwur<Cwu, signal φ92 goes to "L" level. Buffer 93 applies signal φ92 to one input node of AND gate 96. Inverter 94 inverts signal φ92 and applies the inverted signal to one input node of AND gate 97. Inverter 95 inverts output signal φ41 of flip-flop 41 (FIG. 5(A)) and applies the inverted signal to the other input nodes of AND gates 96 and 97. The output signals of AND gates 96 and 97 are gate signals Awu and Bwu, respectively.

When signal φ41 is at "L" level, output signal φ92 of comparator 92 passes through buffer 93 and AND gate 96 to become gate signal Awu, and output signal φ92 of comparator 92 is inverted by inverter 94 and passed through AND gate 97 to become gate signal Bwu. When signal φ41 is at "H" level, gate signals Awu and Bwu which are output signals of AND gates 96 and 97 are both fixed to "L" level.

Gate signal Awu is applied to the gate of each of IGBTs 11 and 14 in the corresponding inverter 10, and gate signal Bwu is applied to the gate of each of IGBTs 12 and 13 included in the corresponding inverter 10. When signal φ41 is at "L" level, the corresponding inverter 10 is operated by gate signals Awu and Bwu. When signal φ41 is at "H" level, gate signals Awu and Bwu are fixed to "L" level so that the operation of the corresponding inverter 10 is stopped.

Figure 9:
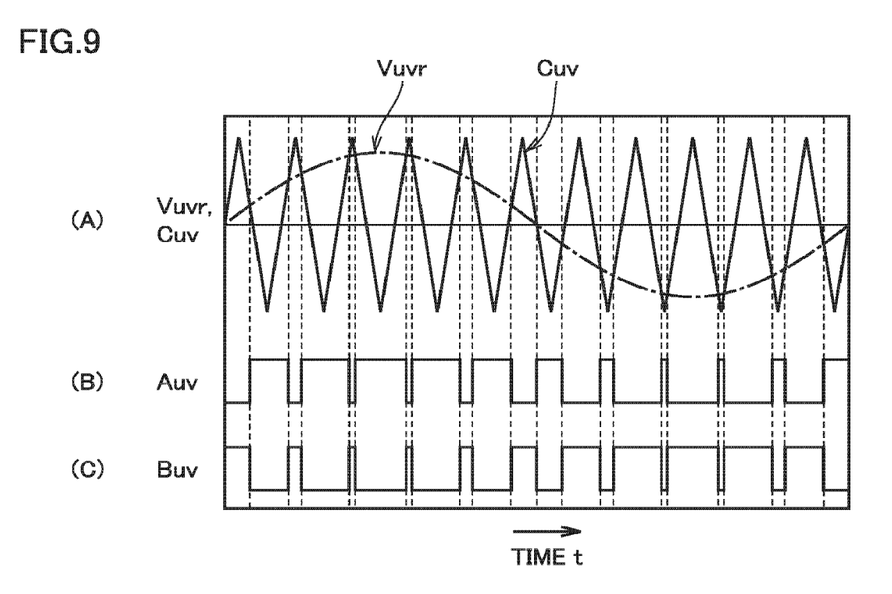
FIG. 9 is a time chart illustrating the waveforms of AC voltage command value Vuvr, carrier signal Cuv, and gate signals Auv and Buv shown in FIG. 8.

FIGS. 9(A), 9(B), and 9(C) are time charts showing the waveforms of AC voltage command value Vuvr, carrier signal Cuv, and gate signals Auv and Buv shown in FIG. 8(A). As shown in FIG. 9(A), AC voltage command value Vuvr is a sinusoidal wave, and carrier signal Cuv is a triangular wave signal. The period of carrier signal Cuv is shorter than the period of AC voltage command value Vuvr, and the amplitude of carrier signal Cuv is larger than the amplitude of AC voltage command value Vuvr.

As shown in FIGS. 9(A) and 9(B), when the level of carrier signal Cuv is higher than AC voltage command value Vuvr, gate signal Auv goes to "L" level, and when the level of carrier signal Cuv is lower than AC voltage command value Vuvr, gate signal Auv goes to "H" level. Gate signal Auv is a positive pulse signal train. In the period during which AC voltage command value Vuvr has positive polarity, the pulse width of gate signal Auv is large, and in the period during which AC voltage command value Vuvr has negative polarity, the pulse width of gate signal Auv is small. As shown in FIGS. 9(B) and 9(C), gate signal Buv is the inverted signal of gate signal Auv.

When gate signals Auv and Buv are at "H" level and "L" level, respectively, IGBTs 11 and 14 included in the corresponding inverter 10 turn on and IGBTs 12 and 13 turn off. In this case, in FIG. 2, the positive-side terminal (positive-side DC line PL) of capacitor 15 is connected to AC terminal 5a through IGBT 11, AC terminal 5b is connected to the negative-side terminal (negative-side DC line NL) of capacitor 15 through IGBT 14, and the terminal-to-terminal voltage of capacitor 15 is output between AC terminals 5a and 5b. In other words, a positive DC voltage is output between AC terminals 5a and 5b.

When gate signals Auv and Buv are at "L" level and "H" level, respectively, IGBTs 12 and 13 included in the corresponding inverter 10 turn on and IGBTs 11 and 14 turn off. In this case, the positive-side terminal (positive-side DC line PL) of capacitor 15 is connected to AC terminal 5b through IGBT 12, AC terminal 5a is connected to the negative-side terminal (negative-side DC line NL) of capacitor 15 through IGBT 13, and the terminal-to-terminal voltage of capacitor 15 is output between AC terminals 5b and 5a. In other words, a negative DC voltage is output between AC terminals 5a and 5b.

As shown in FIGS. 9(B) and 9(C), when the waveforms of gate signals Auv and Buv change, an AC voltage having the same phase as AC voltage command value Vuvr shown in FIG. 9(A) is output between AC terminals 5a and 5b. Since 20 unit converters 5 are cascaded in arm A1, an AC voltage having a value obtained by adding up the AC voltages appearing between AC terminals 5a and 5b of 20 unit converters 5 appear between the terminals of arm A1.

The waveforms of AC voltage command value Vvwr, carrier signal Cvw, and gate signals Avw and Bvw shown in FIG. 8(B) and the waveforms of AC voltage command value Vwur, carrier signal Cwu, and gate signals Awu and Bwu shown in FIG. 8(C) are similar to the waveforms of AC voltage command value Vuvr, carrier signal Cuv, and gate signals Auv and Buv shown in FIGS. 9(A) to 9(C), and a description thereof is not repeated.

Figure 10:
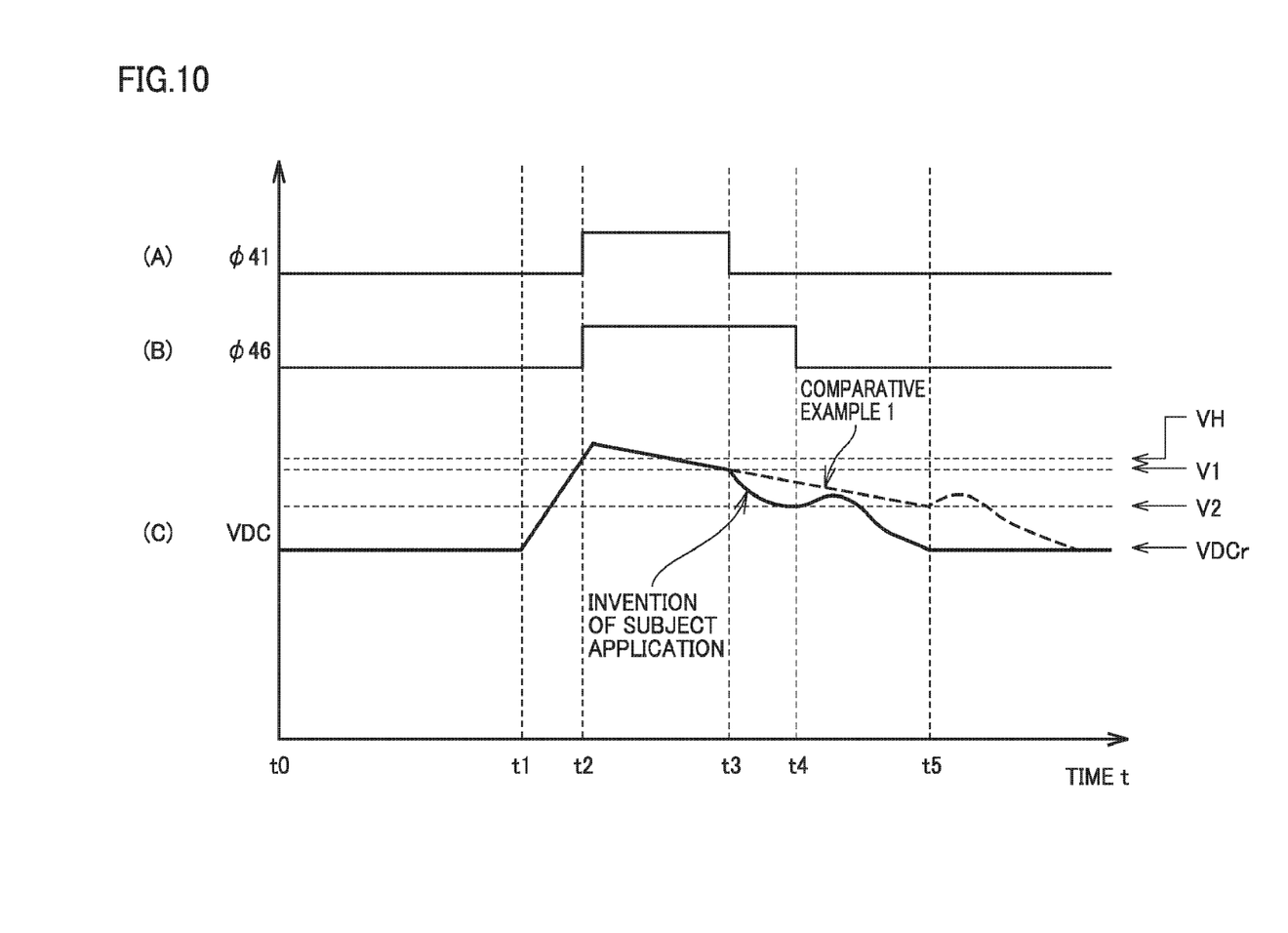
FIG. 10 is a time chart illustrating the operation of the power conversion device shown in FIG. 1 to FIG. 9.

FIGS. 10(A), 10(B), and 10(C) are time charts showing the operation of the power conversion device shown in FIG. 1 to FIG. 9. More specifically, FIGS. 10(A) and 10(B) show signals φ41 and φ46 in FIGS. 5(A) and 5(B), respectively, and FIG. 10(C) shows DC voltage VDC selected as monitor voltage V1\4.

In FIGS. 10(A) to 10(C), it is assumed that in the initial state (time t0), power system 1 is normal, reactive power control and DC voltage control of inverter 10 are executed, DC voltage VDC matches with DC voltage command value VDCr, and both of signals φ41 and φ46 are at "L" level (0).

At a certain time t1, a fault occurs in power system 1 and the voltage of power system 1 rises. Then, in FIG. 1, active current flows through capacitor 15 of each unit converter 5 from power system 1 through switches S1 to S3, transformer 2, switches S4 to S6, AC lines UL, VL, and WL, and reactors L1 to L3, and DC voltage VDC of capacitor 15 rises.

When DC voltage VDC exceeds recovery level V2, recovery level V1, and protection level VH, in FIG. 3, recovery signals B2 and B1 and protection signal P are lowered from "H" level to "L" level. When protection signal P is lowered from "H" level to "L" level, in FIGS. 5(A) and 5(B), flip-flops 41 and 46 are set and both of signals φ41 and φ46 are raised to "H" level (1).

When signal φ41 is brought to "H" level (1), d-axis current command value Idr for performing DC voltage control of inverter 10 is set to zero. In addition, gate signal generation circuits 70, 80, and 90 are deactivated and all of gate signals Auv, Buv, Avw, Bvw, Awu, and Bwu are fixed to "L" level. When signal φ46 is set to "H" level (1), q-axis current command value Iqr for performing reactive power control of inverter 10 is set to zero. In other words, DC voltage control and reactive power control of inverter 10 are stopped, and switching of IGBTs 11 to 14 is stopped.

When power system 1 recovers to the normal state, charge of capacitor 15 is consumed by controller 17 or capacitor 15 discharges by itself, so that DC voltage VDC of capacitor 15 gradually decreases. When DC voltage VDC decreases to protection level VH or lower, protection signal P is raised from "L" level to "H" level.

At time t3, DC voltage VDC decreases to recovery level V1 or lower, and then recovery signal B1 is raised from "L" level to "H" level. When recovery signal B1 is raised to "H" level, flip-flop 41 in FIG. 5(A) is reset, and signal φ41 is lowered to "L" level (0).

When signal φ41 is brought to "L" level (0), deviation ΔVDC between DC voltage command value VDCr and DC voltage VDC is applied to PI controller 44 through switch circuit 43, and PI controller 44 is activated. In addition, gate signal generation circuits 70, 80, and 90 are activated, and DC voltage control of inverter 10 is resumed. DC voltage VDC thus quickly decreases toward DC voltage command value VDCr. There is less voltage variation of power system 1 due to the DC voltage control.

At time t4, DC voltage VDC decreases to recovery level V2 or lower, and then recovery signal B2 is raised from "L" level to "H" level. When recovery signal B2 is raised to "H" level, flip-flop 46 in FIG. 5(B) is reset, and signal φ46 is lowered to "L" level (0).

When signal φ46 is brought to "L" level (0), reactive power deviation ΔQ is applied to PI controller 48 through switch circuit 47, PI controller 48 is activated, and reactive power control of inverter 10 is resumed. When reactive power control is resumed, the voltage of power system 1 slightly rises, active current flows into capacitor 15 from power system 1, and DC voltage VDC slightly rises.

Here, recovery level V2 and protection level VH are set such that DC voltage VDC does not exceed protection level VH. Thus, even when DC voltage VDC exceeds recovery level V2, DC voltage control and reactive power control are continued, and DC voltage VDC gradually decreases. At time t5, DC voltage VDC matches with DC voltage command value VDCr again.

Comparative Example 1

The dotted line in FIG. 10(C) shows change in DC voltage VDC of capacitor 15 in Comparative Example 1. In this Comparative Example 1, when DC voltage VDC exceeds protection level VH, DC voltage control and reactive power control of inverter 10 are stopped, and when DC voltage VDC decreases to recovery level V2 or lower, DC voltage control and reactive power control are resumed simultaneously.

It is assumed that at times t0 to t3, DC voltage VDC in the invention of the subject application and DC voltage VDC in Comparative Example 1 change similarly. In Comparative Example 1, since charge of capacitor 15 is consumed by self-discharge or controller 17 even after time t3, the time necessary for decreasing DC voltage VDC from recovery level V1 to recovery level V2 is longer. In Comparative Example 1, therefore, it takes longer time to resume the operation of inverter 10 after a fault occurs in power system 1.

By contrast, in the present embodiment, since DC voltage control of inverter 10 is resumed when DC voltage VDC decreases to recovery level V1 or lower, DC voltage VDC can be quickly decreased from recovery level V1 to recovery level V2. In the present embodiment, therefore, even when a fault occurs in power system 1, the operation of inverter 10 can be quickly resumed, and the reactive power compensation can be quickly resumed.

Comparative Example 2

Figure 11:
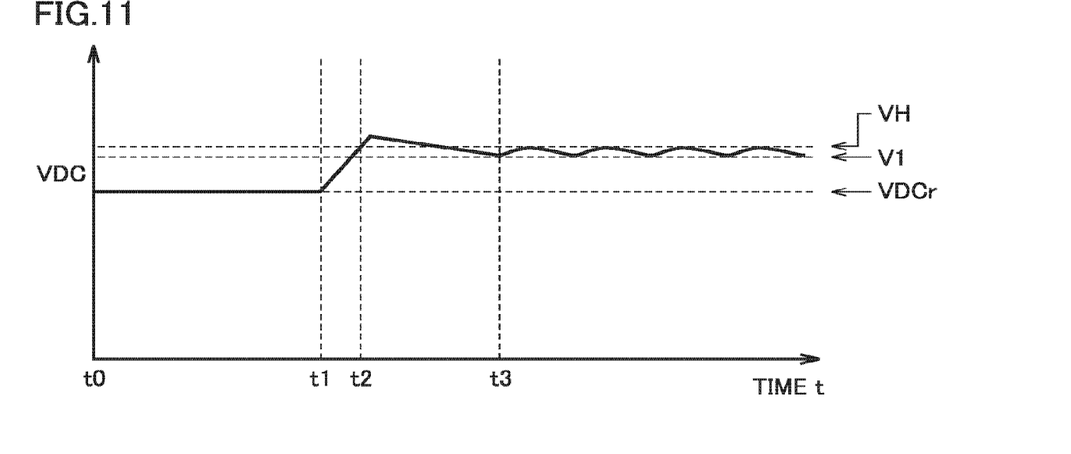
FIG. 11 is a time chart for explaining Comparative Example for the present embodiment.

FIG. 11 is a time chart showing DC voltage VDC of capacitor 15 in Comparative Example 2 for the present embodiment, in comparison with FIG. 10(C). In Comparative Example 2, when DC voltage VDC exceeds protection level VH (time t2), DC voltage control and reactive power control of inverter 10 are stopped, and when DC voltage VDC decreases to recovery level V1 or lower (time t3), both of DC voltage control and reactive power control are resumed.

It is assumed that at times t0 to t3, DC voltage VDC in the invention of the subject application and DC voltage VDC in Comparative Example 2 change similarly. At time t3, DC voltage control and reactive power control are resumed. Then, the voltage of power system 1 rises because of reactive power, active current flows into capacitor 15 from power system 1, and DC voltage VDC rises. Since the difference between protection level VH and recovery level V1 is small, DC voltage VDC exceeds protection level VH, and DC voltage control and reactive power control are stopped again. Subsequently, similar operation is repeated, DC voltage VDC oscillates between protection level VH and recovery level V1, and DC voltage VDC does not match with DC voltage command value VDCr.

By contrast, in the invention of the subject application, reactive power control is resumed after DC voltage VDC is decreased to recovery level V2 or lower which is sufficiently lower than protection level VH through DC voltage control. Thus, unlike Comparative Example 2, DC voltage VDC does not oscillate between protection level VH and recovery level V1.

Comparative Example 3

FIG. 12 is a circuit diagram showing the main part of the power conversion device as Comparative Example 3 for the present embodiment. In FIG. 12, in this Comparative Example 3, a resistor element 101 and a switch 102 are connected in series between DC lines PL and NL of each unit converter. Switch 102 is normally off.

When a fault occurs in power system 1 and DC voltage VDC of capacitor 15 exceeds protection level VH, the operation of inverter 10 is stopped and switch 102 is turned on. When switch 102 is turned on, current flows from capacitor 15 to resistor element 101, and DC voltage VDC quickly decreases. When DC voltage VDC decreases to recovery level V2 or lower, switch 102 is turned off, and DC voltage control and reactive power control of inverter 10 are resumed.

In this Comparative Example 3, even when a fault occurs in power system 1, the operation of inverter 10 can be quickly resumed. In Comparative Example 3, however, it is necessary to provide resistor element 101 and switch 102 corresponding to each of a large number of capacitors 15, leading to a size increase of the device. By contrast, in the present embodiment, since there is no need for providing resistor element 101 and switch 102, the required device size is smaller than in Comparative Example 3.

As described above, in the present embodiment, when DC voltage VDC of capacitor 15 exceeds protection level VH, the operation of inverter 10 is stopped. When DC voltage VDC decreases to recovery level V1 or lower, DC voltage control of inverter 10 is resumed to decrease DC voltage VDC. When DC voltage VDC decreases to recovery level V2 or lower, reactive power control of inverter 10 is resumed. Thus, even when a fault occurs in power system 1, the operation of inverter 10 can be quickly resumed. Compared with when a series connection of resistor element 101 and switch 102 is connected in parallel with capacitor 15, the size of the device can be reduced.

In the present embodiment, each of arms A1 to A3 includes multiple stages of unit converters 5. However, the invention of the subject application is applicable when each of arms A1 to A3 includes only a single stage of unit converter 5.

In the present embodiment described above, recovery level V1 is set to a level lower than protection level VH (V1<VH). However, recovery level V1 may be set to the same level as protection level VH (V1=VH). In this case, however, when DC voltage control of inverter 10 is resumed to cause DC voltage VDC to slightly fluctuate, DC voltage VDC may exceed protection level VH again and the operation of inverter 10 may be stopped.

The embodiments disclosed here should be understood as being illustrative in all respects and should not be construed as being limitative. The scope of the present invention is shown not in the foregoing description but in the claims, and it is intended that all modifications that come within the meaning and range of equivalence to the claims are embraced here.

REFERENCE SIGNS LIST 1 power system, 1u, 1v, 1w power transmission line, S1 to S7, 102 switch, 2, 3 transformer, R1 to R3 current-limiting resistor, UL, VL, WL AC line, C1 to C3 current transformer, L1 to L3 reactor, A1 to A3 arm, 4 control device, 5 unit converter, 5a, 5b AC terminal, 10, 74, 75, 84, 85, 94, 95 inverter, 11 to 14 IGBT, PL, NL DC line, 15 capacitor, 16 voltage detector, 17 controller, 20 signal generation circuit, 21 monitor voltage generator, 22 to 24, 72, 82, 92 comparator, 30 reactive power deviation calculating unit, 31 calculator, 32, 33 DQ converter, 34 reactive power calculator, 35, 42, 51, 61 subtractor, 40 DC voltage controller, 41, 46 flip-flop, 43, 47 switch circuit, 44, 48, 52, 62 PI controller, 45 reactive power controller, 50, 60 current controller, 53, 63 adder, 65 inverse DQ converter, 70, 80, 90 gate signal generation circuit, 73, 83, 93 buffer, 76, 77, 86, 87, 96, 97 AND gate, 101 resistor element.

The invention claimed is:

1. A power conversion device comprising:
a capacitor;
an inverter configured to transfer electric power between the capacitor and a power system;
a first controller configured to perform DC voltage control of the inverter such that DC voltage of the capacitor attains a first command value; and
a second controller configured to perform reactive power control of the inverter such that reactive power transferred between the capacitor and the power system attains a second command value, wherein
the first and second controllers are configured to stop the DC voltage control and the reactive power control, respectively, in response to the DC voltage exceeding a protection level higher than the first command value,
the first controller is configured to resume the DC voltage control in response to the DC voltage decreasing to a first recovery level or lower, the first recovery level being equal to or lower than the protection level, and
the second controller is configured to resume the reactive power control in response to the DC voltage decreasing to a second recovery level or lower, the second recovery level being lower than the first recovery level.

2. The power conversion device according to claim 1, wherein
when a fault occurs in the power system and current flows into the capacitor from the power system through the inverter, the DC voltage rises, and
when the inverter is operated with the DC voltage exceeding a permissible level higher than the protection level, the inverter is broken.

3. The power conversion device according to claim 1, further comprising:

a first detector configured to detect the DC voltage; and
a second detector configured to detect the reactive power, wherein
the first controller is configured to perform the DC voltage control based on a detection result of the first detector, and
the second controller is configured to perform the reactive power control based on a detection result of the second detector.

4. The power conversion device according to claim 1, further comprising a signal generation circuit configured to output a protection signal in response to the DC voltage exceeding the protection level, output a first recovery signal in response to the DC voltage decreasing to the first recovery level or lower, and output a second recovery signal in response to the DC voltage decreasing to the second recovery level or lower, wherein
the first and second controllers are configured to stop the DC voltage control and the reactive power control, respectively, in response to the protection signal,
the first controller is configured to resume the DC voltage control in response to the first recovery signal, and
the second controller is configured to resume the reactive power control in response to the second recovery signal.

5. The power conversion device according to claim 1, further comprising a plurality of unit converters each including the capacitor and the inverter, wherein
a plurality of the inverters included in the unit converters are cascaded,
the first controller is configured to perform the DC voltage control of a corresponding one of the inverters, and
the second controller is configured to perform the reactive power control of the corresponding one of the inverters.

6. The power conversion device according to claim 5, further comprising a signal generation circuit configured to output a protection signal in response to any one of a plurality of the DC voltages exceeding the protection level, output a first recovery signal in response to the anyone of a plurality of the DC voltages decreasing to the first recovery level or lower, and output a second recovery signal in response to the anyone of a plurality of the DC voltages decreasing to the second recovery level or lower, wherein
the first controller is configured to stop the DC voltage control of the corresponding one of the inverters in response to the protection signal,
the second controller is configured to stop the reactive power control of the corresponding one of the inverters in response to the protection signal,
the first controller is configured to resume the DC voltage control of the corresponding one of the inverters in response to the first recovery signal, and
the second controller is configured to resume the reactive power control of the corresponding one of the inverters in response to the second recovery signal.

7. The power conversion device according to claim 5, further comprising three arms each including the unit converters,
wherein the three arms are delta-connected.

8. The power conversion device according to claim 7, wherein the power conversion device is used as a reactive power compensator configured to compensate for reactive power of the power system.

* * * * *